United States Patent [19]
Murata

[11] Patent Number: 6,009,305
[45] Date of Patent: Dec. 28, 1999

[54] DIGITAL VIDEO SIGNAL MULTIPLEX TRANSMISSION SYSTEM

[75] Inventor: Nobuo Murata, Musashino, Japan

[73] Assignee: Hitachi Denshi Kabushiki Kaisha, Tokyo, Japan

[21] Appl. No.: 08/662,141

[22] Filed: Jun. 12, 1996

Related U.S. Application Data

[63] Continuation-in-part of application No. 08/361,724, Dec. 23, 1994, Pat. No. 5,701,581.

[30] Foreign Application Priority Data

| Dec. 28, 1993 | [JP] | Japan | 5-352868 |
| May 27, 1994 | [JP] | Japan | 6-115244 |
| Jun. 14, 1995 | [JP] | Japan | 7-147506 |

[51] Int. Cl.$^6$ .............. H04N 7/18; H04H 1/00
[52] U.S. Cl. .............. 455/5.1; 348/12; 348/212
[58] Field of Search .................. 348/212, 423, 348/473, 469, 6, 426, 14, 15, 12, 16; 370/282, 278, 29; 375/219, 222; 455/5.1

[56] References Cited

U.S. PATENT DOCUMENTS

| 4,644,524 | 2/1987 | Emery | 370/29 |
| 4,878,242 | 10/1989 | Springer et al. | 379/204 |
| 4,888,795 | 12/1989 | Ando et al. | 348/18 |
| 5,229,850 | 7/1993 | Toyoshima | 358/108 |
| 5,231,492 | 7/1993 | Dangi et al. | 348/15 |
| 5,371,534 | 12/1994 | Dagdeviren et al. | 348/16 |
| 5,392,284 | 2/1995 | Sugiyama | 348/17 |
| 5,396,269 | 3/1995 | Gotoh et al. | 348/14 |
| 5,400,068 | 3/1995 | Ishida et al. | 348/16 |
| 5,402,418 | 3/1995 | Shibata et al. | 370/62 |
| 5,408,261 | 4/1995 | Kamata et al. | 348/17 |
| 5,412,418 | 5/1995 | Nishimura et al. | 348/17 |
| 5,701,581 | 12/1997 | Eto et al. | 348/212 |

FOREIGN PATENT DOCUMENTS

| 0271969 | 6/1988 | European Pat. Off. | H04N 7/18 |
| 0589657 | 3/1994 | European Pat. Off. | H04N 7/14 |
| 0661883 | 7/1995 | European Pat. Off. | H04N 7/18 |
| 91/02414 | 2/1991 | WIPO | H04B 1/66 |

OTHER PUBLICATIONS

*Patent Abstracts of Japan*, vol. 11, No. 240 (E–529), Aug. 6, 1987 (for JP–A–62–53095, H. Kuroda et al., published Mar. 7, 1987).

J. Kirsten et al., "One coax cable carries video and power", *Electrical Design News*, vol. 36, No. 6, Mar. 14, 1991, pp. 137–138, 140.

M. Kato et al., "Visual Communication System in an Apartment House Using Only Twisted Paired Cable", *IEEE Transactions on Consumer Electronics*, vol. 40, No. 3, Aug. 1994, pp. 418–426.

U.S. application No. 08/635,699, filed on Apr. 22, 1996.
U.S. application No. 08/839,489, filed on Apr. 14, 1997.
U.S. application No. 08/877,560, filed on Jun. 17, 1997.

*Primary Examiner*—Victor R. Kostak
*Attorney, Agent, or Firm*—Antonelli, Terry, Stout & Kraus, LLP

[57] ABSTRACT

In each of two video appliances mutually connected by means of a transmission line, video, voice and other signals are converted to digital signals, subjected to time-division multiplexing and time-base compressing operations to generate a transmission signal having a repetition of signal presence and absence periods, and then the transmission signal is transmitted to the transmission line. While the transmission signal of the signal absence period is transmitted from one of the video appliances to the transmission line, the transmission signal of the signal presence period is transmitted from the other video appliance to the transmission line; whereas, while the transmission signal of the signal presence period is transmitted from one video appliance to the transmission line, the transmission signal of the signal absence period is transmitted from the other video appliance to the transmission line. In each of the video appliances, there is stopped at least one of the operation of a reception circuit of the video appliance during transmission of the transmission signal of the signal presence period from a transmission circuit to the transmission line and the operation of the transmission circuit of the video appliance during reception of the transmission signal of the signal presence period transmitted from the reception circuit through the transmission line.

8 Claims, 6 Drawing Sheets

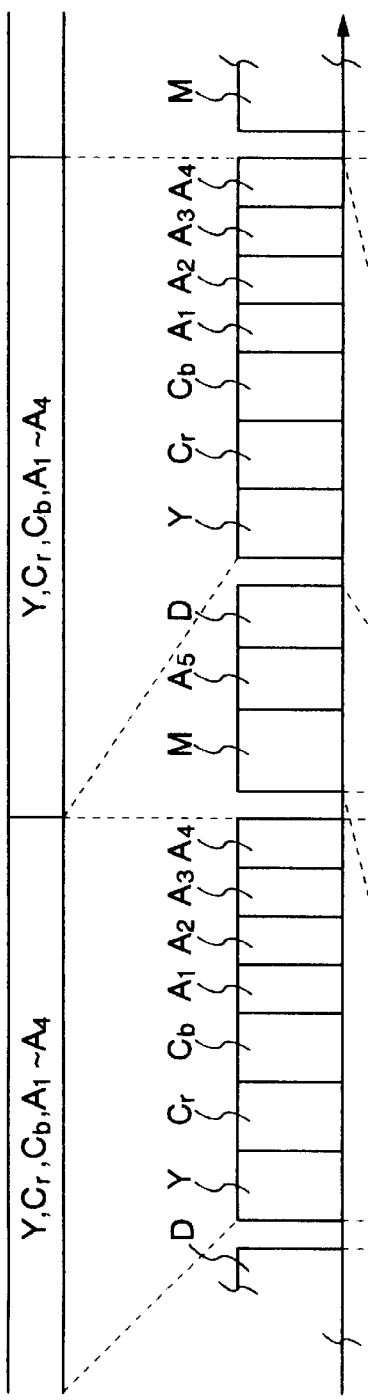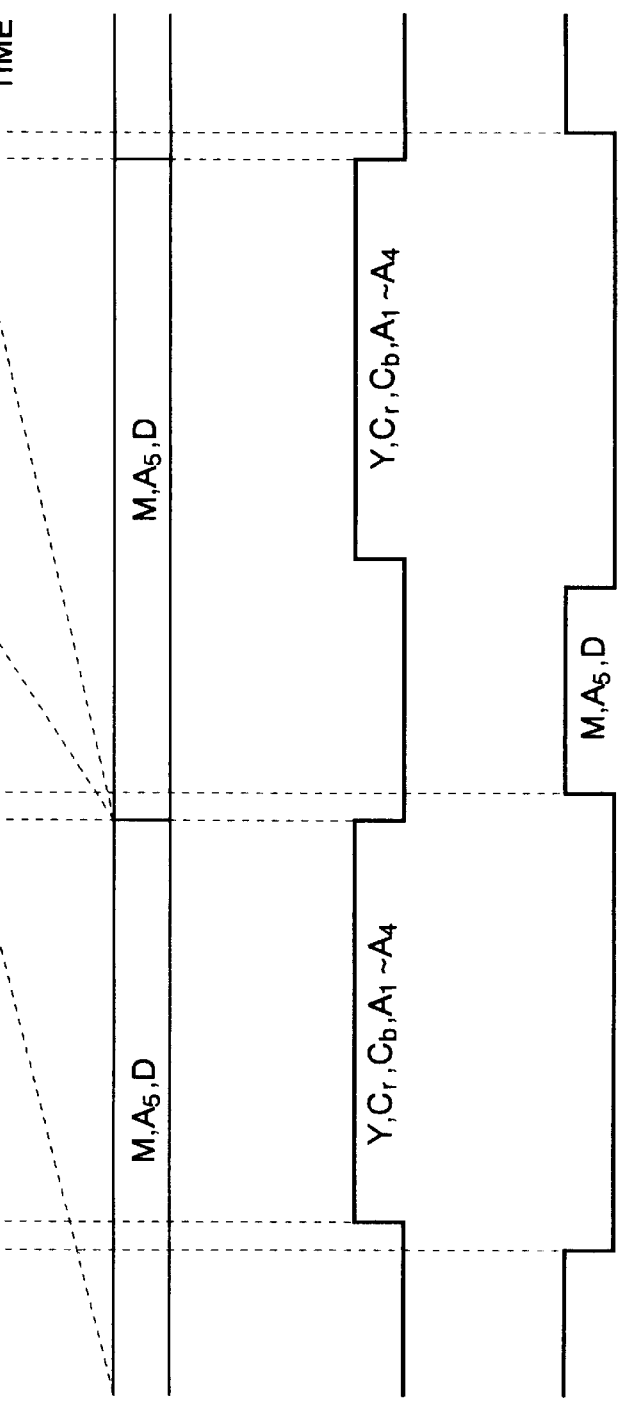

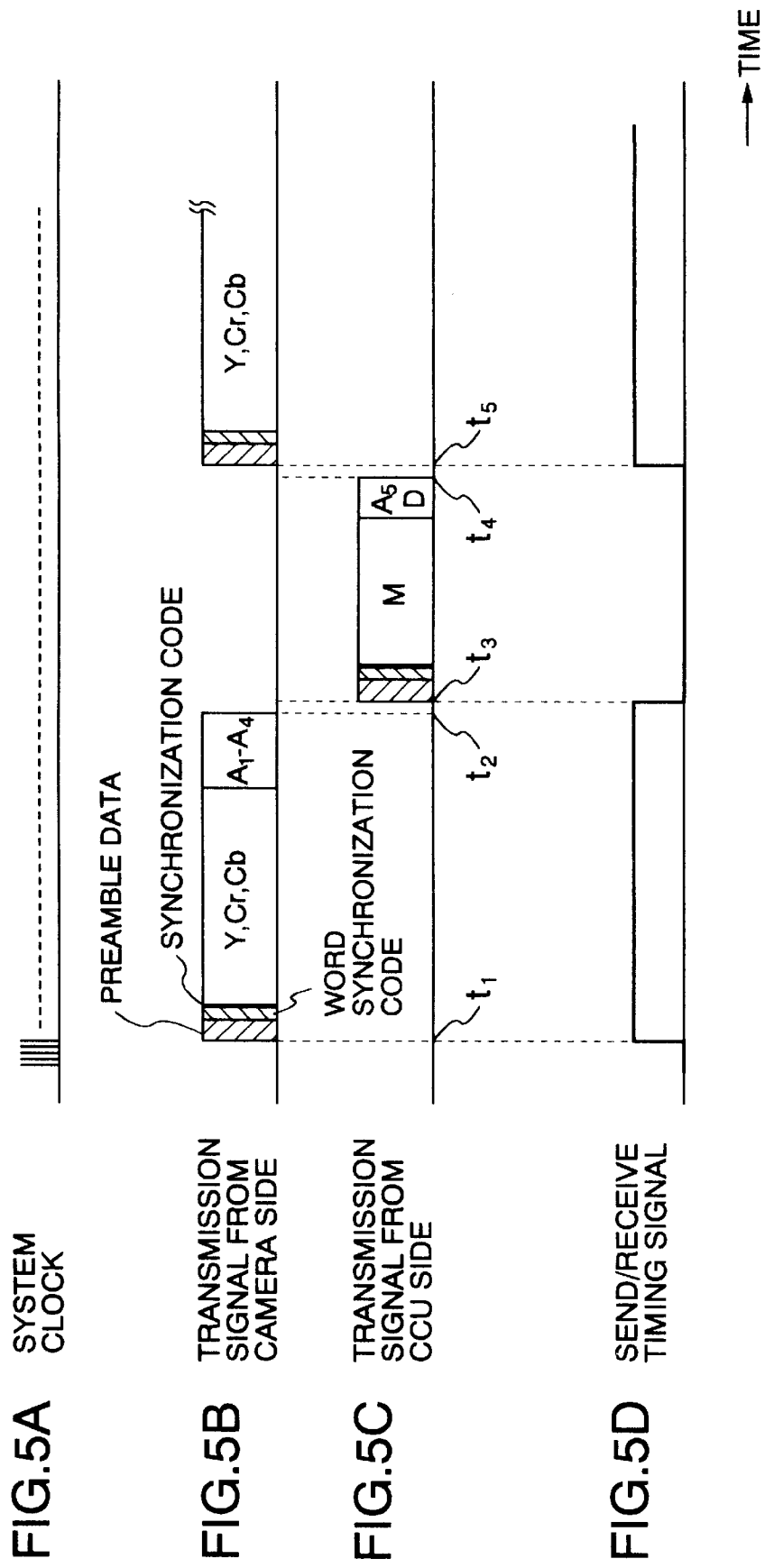

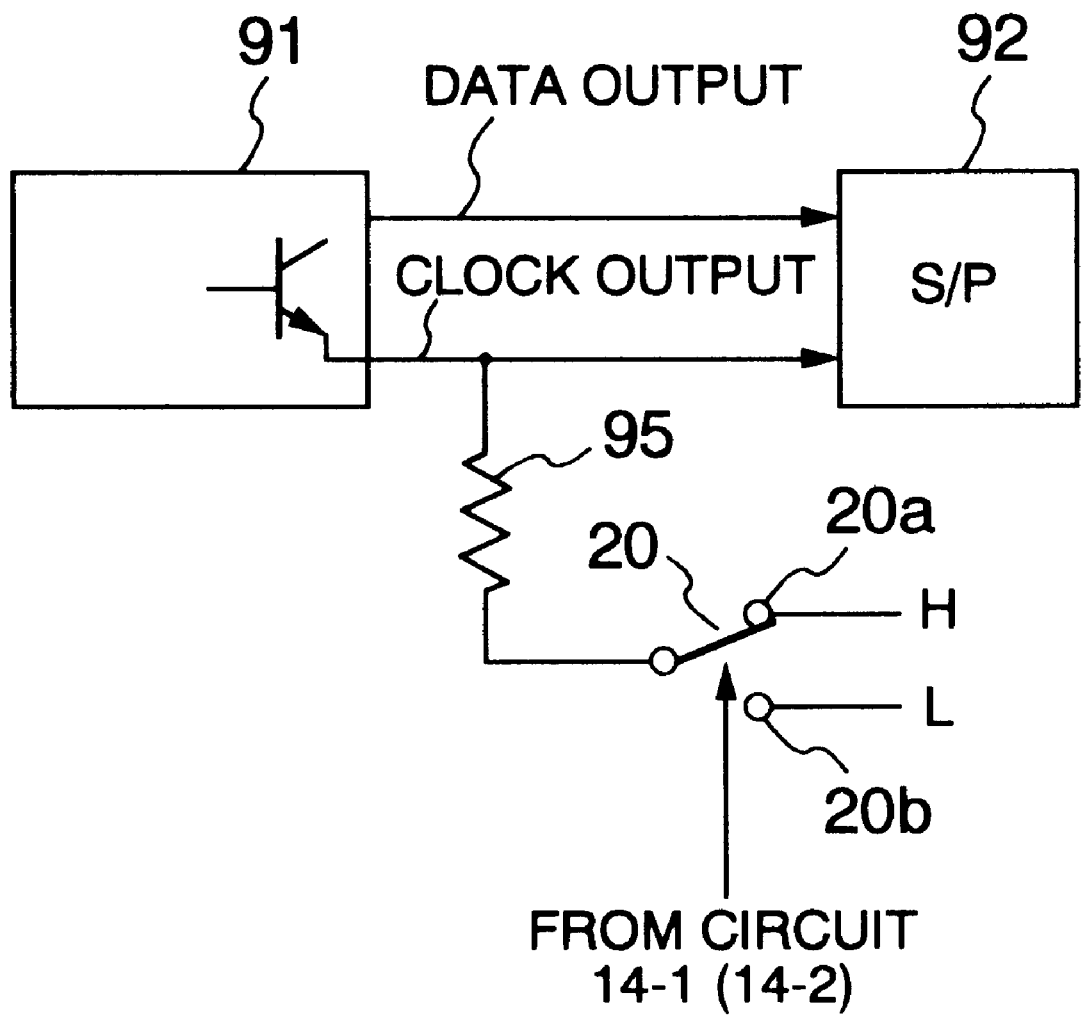

DIGITAL VIDEO SIGNAL MULTIPLEX TRANSMISSION SYSTEM

CROSS-REFERENCE TO RELATED APPLICATION

This is a continuation-in-part of application Ser. No. 08/361,724 filed on Dec. 23, 1994, now U.S. Pat. No. 5,701,581, the contents of which are incorporated herein by reference.

BACKGROUND OF THE INVENTION

The present invention relates to a system for transmitting video, voice and control signals on a multiplex bi-directional transmission basis in both directions at the same time between two video appliances, e.g., between a television camera (which will be referred merely as the camera, hereinafter) and a unit for controlling the camera, i.e., camera control unit (CCU) (which unit will be referred merely as the CCU, hereinafter).

When it is desired to connect the camera to the CCU to attain multiplex bi-directional transmission of video, voice and control signals therebetween for example, it has been conventionally well known to use a triplex coaxial cable (which will be referred to as the cable, hereinafter) called TRIAX cable to transmit these signals on a frequency division multiplex communication basis. An example of the above system is shown in FIG. 1, in which 3 sorts of video signals R, G and B and 4 sorts of voice signals A1, A2, A3 and A4 generated at a camera 100 are transmitted from the camera 100 to a CCU 200, while a monitoring video signal M generated at the CCU 200, a voice signal A5, a control signal D for controlling the operation of the camera 100 and so on are transmitted from the CCU 200 to the camera 100.

In order to transmit a plurality of signals in two ways through a single transmission line or cable 7, different frequency bands are assigned respectively exclusively to these signals so that the carriers of the signals having the different frequency bands are subjected to amplitude modification (AM), as shown in FIG. 2. This results in that, due to the provision of a filter in the camera 100 or CCU 200, these signals appearing on the cable 7 at the same time can be separated from each other on the side of the camera 100 or CCU 200 without interfering with each other at their all components.

SUMMARY OF THE INVENTION

In the aforementioned multiplex transmission system, since the signals are subjected to the amplitude modulation and then transmitted in an analog form, the signals are influenced by the characteristics of the cable or filter, which results in that video and voice signals obtained at the side of the camera or CCU are susceptible to their characteristic deterioration.

Further, as mentioned above, in order to separate the plurality of signals present on the single cable at the same time and having the respectively different frequency bands at the side of the camera or CCU without interfering with each other, an expensive filter is required, thus disadvantageously increasing its cost inevitably.

To avoid this problem, the same applicant as the present application discloses a technique in which video, voice and other signals are digitized at both ends of a transmission line, subjected to a time division multiplexing operation and then to a time-base compression to generate a transmission signal having a repetition of signal presence and absence periods, in such a manner that the transmission signal at one end of the transmission line is transmitted to the other end while the transmission signal at the other end is transmitted to one end during the absence of the transmission signal at one end, thus enabling bi-directional transmission through the single transmission line. Such a technique is disclosed in U.S. Ser. No. 08/361,724 filed Dec. 23, 1994 and also EP Patent Appln. No. 94309860.8 filed Dec. 28, 1994.

Video appliances (e.g., camera-side and CCU-side video appliances) provided at the both ends of such a transmission line have transmission and reception circuits respectively. Accordingly, in each of the camera- and CCU-side video appliances, even while the transmission circuit is sending a signal, the reception circuit is put in its operative state (that is, even when the reception circuit is not performing its signal receiving operation, it is put in the operative state in response to a clock). At the same time, even while the reception circuit is receiving a signal, the transmission circuit is put in its operative state (that is, even when the transmission circuit is not performing its signal transmitting operation, it is put in the operative state in response to a clock). As a result, since the reception circuit is put in the operative state during the signal transmitting operation of the transmission circuit, there is a possibility that a signal generated through the operation of the reception circuit has an adverse effect on the operation of the transmission circuit, thus undesirably adding increased noise or jitter to an output of the transmission circuit. Similarly, since the transmission circuit is put in the operative state during the signal receiving operation of the reception circuit, there is a possibility that a signal generated through the operation of the transmission circuit has an adverse effect on the operation of the reception circuit, thus undesirably adding increased noise or jitter to an output of the reception circuit.

It is therefore an object of the present invention to provide a digital video signal multiplex transmission system which can stably operate while preventing increase of noise or jitter.

In accordance with an aspect of the present invention, there is provided a video signal transmission system wherein digital signals containing at least digital video signals and digital audio signals are bidirectionally transmitted and received in substantially real time in first and second video appliances coupled via a transmission path, the first video appliance including a first transmitting and receiving apparatus and the second video appliance including a second transmitting and receiving apparatus, the first transmitting and receiving apparatus includes: a unit for producing a first digital signal by time-division multiplexing at least the digital video signal and the digital audio signal; a unit for dividing the first digital signal into a plurality of predetermined periods and time-base compressing the first divided digital signal to produce a first divided and compressed digital signal representing a signal period and no signal period alternately; a transmitting unit for transmitting the first divided and compressed digital signal to the second video appliance through the transmission path in a manner that the first divided and compressed digital signal during the signal period thereof is transmitted through the transmission path during no signal period of a second divided and compressed digital signal transmitted through the transmission path from the second video appliance; a receiving unit for receiving the second divided and compressed digital signal repeating a signal period and the no signal period alternately from the second video appliance through the transmission path in a manner that the second divided and compressed digital signal during the signal period thereof is transmitted through the transmission path during the no signal period of the first divided and compressed digital signal transmitted to the second video appliance through the transmission path; an expanding and separating unit for time-base expanding the second divided and compressed digital signal and for separating the time-base expanded second digital signal to reproduce at least a digital video signal and a digital audio signal; and a stopping unit for stopping one of operation of the expanding and separating unit during each period where the receiving unit receives the signal period of the second divided and compressed digital signal and operation of the transmitting unit during each period where the transmitting unit transmits the no signal period of the first divided and compressed digital signal.

In a preferable embodiment of the present invention, the first transmitting and receiving apparatus further includes a clock generation circuit for generating a system clock for activation of the transmitting unit and providing the system clock to the transmitting unit, and the stopping unit stops supply of the system clock from the clock generation circuit to the transmitting unit during the no signal period of the first divided and compressed digital signal transmitted by the transmitting unit.

In another preferable embodiment, the expanding and separating unit of the first transmitting and receiving apparatus has a clock generation circuit for generating a clock on the basis of the second divided and compressed digital signal during the signal period thereof and a circuit for expanding and separating the second divided and compressed digital signal during the signal period thereof on the basis of the clock generated by the clock generation circuit, and the stopping unit stops supply of the clock from the clock generation circuit to the expanding and separating circuit during each period where the receiving unit receives the signal period of the second divided and compressed digital signal.

In this way, in the embodiment of the present invention, there is provided a video signal transmission system wherein, while the transmission signal of the signal absence period is transmitted from one of the video appliances to the transmission line, the transmission signal of the signal presence period is transmitted from the other video appliance to the transmission line; whereas, while the transmission signal of the signal presence period is transmitted from one video appliance to the transmission line, the transmission signal of the signal absence period is transmitted from the other video appliance to the transmission line, and wherein, in each of the video appliances, there is stopped at least one of the operation of a reception circuit (expanding and separating circuit) of the video appliance during transmission of the transmission signal of the signal presence period from a transmission circuit to the transmission line and the operation of the transmission circuit of the video appliance during reception of the transmission signal of the signal presence period transmitted from the reception circuit through the transmission line.

Therefore, since the reception circuit of one video appliance is not operated during transmission of the transmission signal of the signal presence period from one video appliance, there can be avoided such a problem that the signal based on the operation of the reception circuit has an adverse effect on the output of the transmission circuit. Similarly, since the transmission circuit of one video appliance is not operated during reception of the transmission signal of the signal presence period by one video appliance, there can be avoided such a problem that the signal based on the operation of the transmission circuit has an adverse effect on the output of the reception circuit.

As a result, since no reception signal is input to one end side of the transmission line during signal transmission therefrom, there can be avoided such a problem that the output clock of the phase locked loop (PLL) circuit of the receiver transmitted at a self-oscillation frequency interferes with the transmission signal, thus leading to increase in the jitter of the output signal.

According to the present invention, in this way, there can be solved such a problem that, when the reception circuit is operated during the signal transmitting operation or when the transmission circuit is operated during the signal receiving operation, the both signals interfere with each other, which results in that noise or jitter is increased in the output of the transmission or reception circuit.

BRIEF DESCRIPTION OF THE DRAWINGS

FIGS. 4A–4E are timing charts for explaining a multiplexed send/receive signals to which the embodiment of the present invention is applied;

FIGS. 5A–5D are timing chart, showing a relationship among a camera-side transmission signal, a CCU-side transmission signal and a send/receive timing signal;

FIG. 7 is a configuration of a clock stopping circuit in the reception circuit of FIG. 6.

DESCRIPTION OF THE PREFERRED EMBODIMENTS

An embodiment of a digital video signal multiplex transmission system in accordance with the present invention will be explained with reference to the accompanying drawings.

Figure 3:
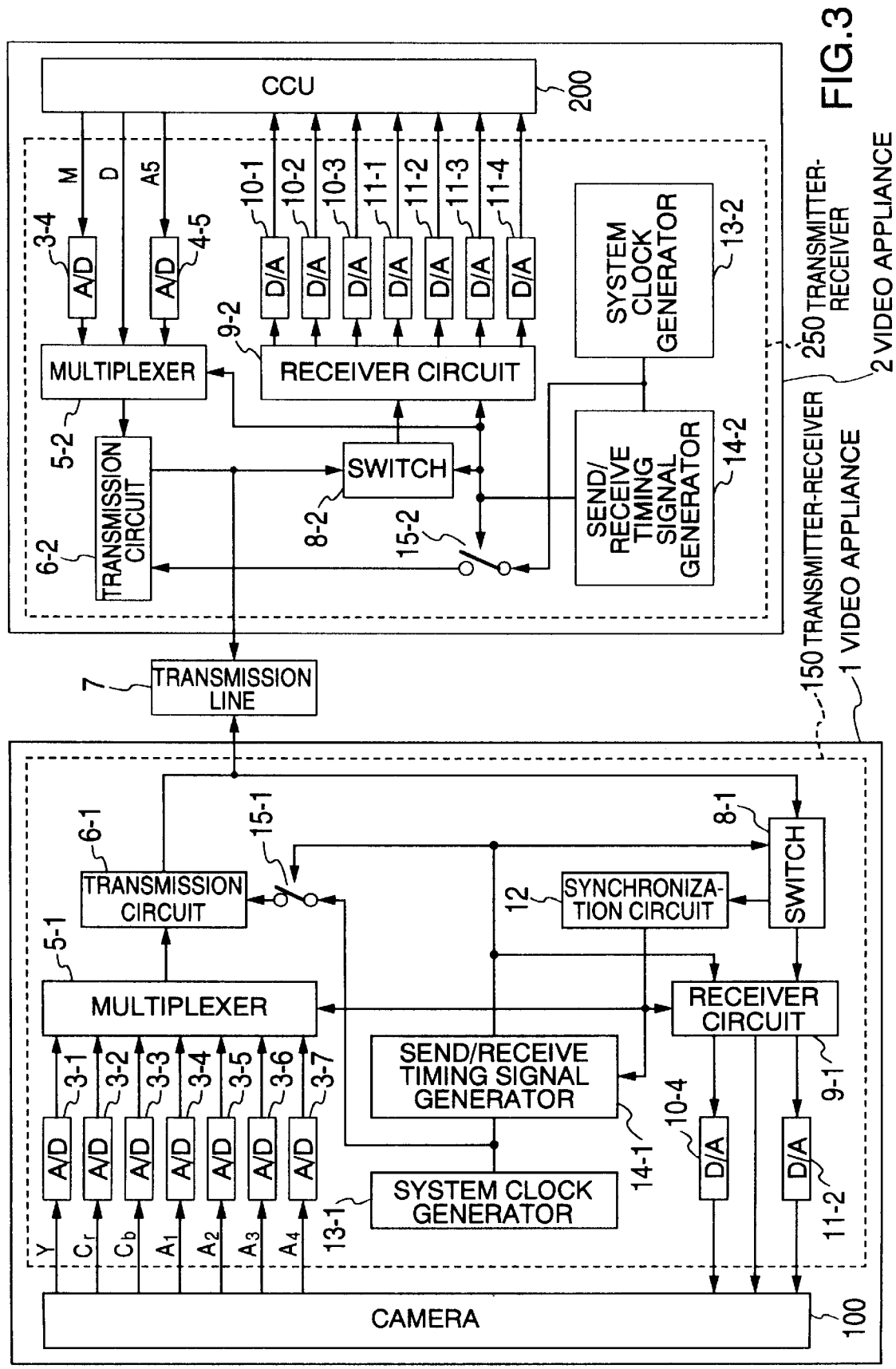
FIG. 3 is a block diagram of an embodiment of a digital video signal multiplex transmission system in accordance with the present invention.

Referring to FIG. 3, there is shown a block diagram of an embodiment of a digital video signal multiplex transmission system in accordance with the present invention.

Explanation will first be made as to a technique in which video, voice and other signals are digitized at both ends of a transmission line, subjected to a time division multiplexing operation and then to a time-base compression to generate a transmission signal having a repetition of signal presence and absence periods, in such a manner that the transmission signal at one end of the transmission line is transmitted to the other end while the transmission signal at the other end is transmitted to one end during the absence of the transmission signal at one end. However, since details of such a technique is disclosed in the aforesaid U.S. Ser. No. 08/361, 724 and EP Patent Appln. No. 94309860.8, explanation thereof is briefly made herein.

In FIG. 3, a camera-side video appliance 1 has a camera 100 and a transmitter-receiver 150 connected to the camera 100, whereas a video appliance 2 has a CCU 200 and a transmitter-receiver 250 connected to the CCU 200, the camera-side video appliances 1 and 2 being connected by means of a single transmission line 7.

Video signals issued from the camera 100 are assumed in the illustrated example to be a luminance signal Y and two sorts of color differential signals Cr and Cb in place of the aforementioned R, G and B. It is also assumed that the color differential signals Cr and Cb have each a frequency band corresponding to ½ of that of the luminance signal Y. These 3 sorts of signals are converted to digital signals through analog-to-digital (A/D) converters 3-1, 302 and 3-3 of the transmitter-receiver 150. In this case, with respect to a sampling frequency (e.g., 13.5 MHz) of the A/D converter 3-1, the A/D converters 302 and 3-3 may be set to be ½ or less (e.g., 6.75 MHz) of that of the A/D converter 3-1. Further, since the number of quantizing bits may be 8 for all the signals, a sum (108 Mb/s) of bit rates of the color differential signals Cr and Cb is equal to the bit rate of the luminance signal Y.

Meanwhile, a video signal M generated at the CCU 200 is similarly converted to a digital signal through an A/D converter 3-4 of the transmitter-receiver 250. The sampling frequency and the number of quantizing bits may be equal to those of the luminance signal Y, and thus the bit rate thereof becomes equal to that of the luminance signal Y. In this connection, in the case where the number of scanning lines per frame for the video signal is 525 and a frame frequency is 29.97 Hz, sampling at 13.5 MHz means to select the number of sampled number (pixel number) per scanning line to be 858 (=13,500,000÷525÷29.97).

Voice signals A1, A2, A3, A4 and A5 generated at the camera 100 are converted to digital signals through the A/D converters 4-1, 4-2, 4-3, 4-4 and 4-5 of the transmitter-receiver 150 respectively. In this connection, the sampling frequency and the number of quantizing bits are, e.g., 48 kHz and 16 bits respectively, and bit rates thereof are each 768 kb/s. The bit rate of the control signal D is set to be about 768 kb/s for simplification of the explanation.

In the camera-side transmitter-receiver, the digitized video signals Y, Cr and Cb as well as the video signals A1, A2, A3 and A4 are subjected at a multiplexing circuit 5-1 to a time-division multiplexing operation and then to a time-base compressing operation to generate a transmission signal having a repetition of signal presence/absence periods, and the transmission signal is sent to the transmission line 7 through a transmission circuit 6-1.

In the CCU-side transmitter-receiver 250, similarly, the digitized video signal M, voice signal A5 and control signal D are subjected at a multiplexing circuit 5-2 to a time-division multiplexing operation and then to a time-base compressing operation to generate a transmission signal having a repetition of signal presence/absence periods, and the transmission signal is sent to the transmission line 7 through a transmission circuit 6-2.

Also in the CCU-side transmitter-receiver 250, a signal received from the transmission line or cable 7 is sent through a switch unit 8-2 to a separation or demultiplexer circuit 9-2 (receiver circuit) where the received signal is subjected to a time-base expanding operation to obtain the video signals Y, Cr and Cb as well as the video signals A1, A2, A3 and A4. In the camera-side transmitter-receiver 150, on the other hand, a signal received from the transmission line or cable 7 is sent through a switch unit 8-1 to a separation or demultiplexer circuit 9-1 (receiver circuit) where the received signal is subjected to a time-base expanding operation to obtain the video signal M, voice signal A5 and control signal D.

The transmission signals sent along the cable 7 in two ways will now be explained with use of FIGS. 4A–4E. More specifically, FIG. 4A shows the video signals Y, Cr and Cb and video signals A1 to A4 subjected to the time division multiplexing operation at the multiplexing circuit 5-1 of the camera side; and FIGS. 4B and 4D are the time-division multiplexed signal further subjected a the multiplexing circuit 5-1 to the time-base compressing operation to be sent as a transmission signal onto the cable 7 through the transmission circuit 6-1. Similarly, FIG. 4C shows the video signal M, video signal A5 and control signal D subjected to the time division multiplexing operation at the multiplexing circuit 5-2 of the CCU side; and FIGS. 4B and 4E are the time-division multiplexed signal further subjected a the multiplexing circuit 5-2 to the time-base compressing operation to be sent as a transmission signal onto the cable 7 through the transmission circuit 6-2. In the respective transmission signals in FIGS. 4A–4E, such a synchronizing code and so on (to be explained later) as shown in FIGS. 5A–SD are omitted.

By the way, in order to separate the reception signal from the transmission signal at the switch 8-1 or 8-2, it is necessary to provide timing control in such a manner that an end part of the reception signal is not overlapped with a start part of the transmission signal.

To this end, it is necessary to establish synchronism between the transmitter-receiver 150 and transmitter-receiver 250 with respect to the video signal. In an ordinary camera system, it is common practice to synchronize a video signal at the side of the camera 100 with a video signal from the side of the CCU 200. The above synchronization between the video signals is carried out in the following manner when it is desired to realize digital transmission. When it is desired to realize digital transmission, in general, a parallel signal having a bit length of about 8 bits or 10 bits is converted to a serial signal before transmission thereof. Thus, it is necessary to restore the serial signal to the parallel signal at the receiver side. To this end, there is employed a method for add a word synchronizing code as a mark indicative of a break in the word in the vicinity of a leading head part of each transmission signal (usually, immediately after preamble data inserted in the head part of the data), as shown in FIGS. 5A and 5B. Further, horizontal or vertical synchronization information as the synchronization information on the video signal is previously added to the tail part of the word synchronizing code so that, when the synchronization information is extracted by a synchronization circuit 12 (FIG. 3) provided in the side of the camera to reset a counter of a send/receive timing signal generation circuit 14-1, the synchronization in the video signal between the camera 100 and CCU 200 sides can be easily established.

Figure 1:
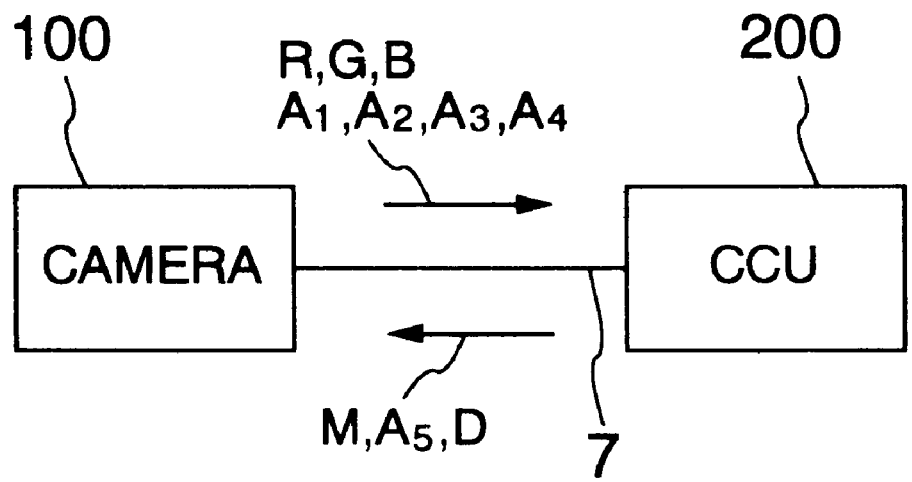
FIG. 1 is a diagram for explaining flows of multiplexed transmission signals between a camera and a CCU, to which the present invention is applied as an example.
Figure 2:
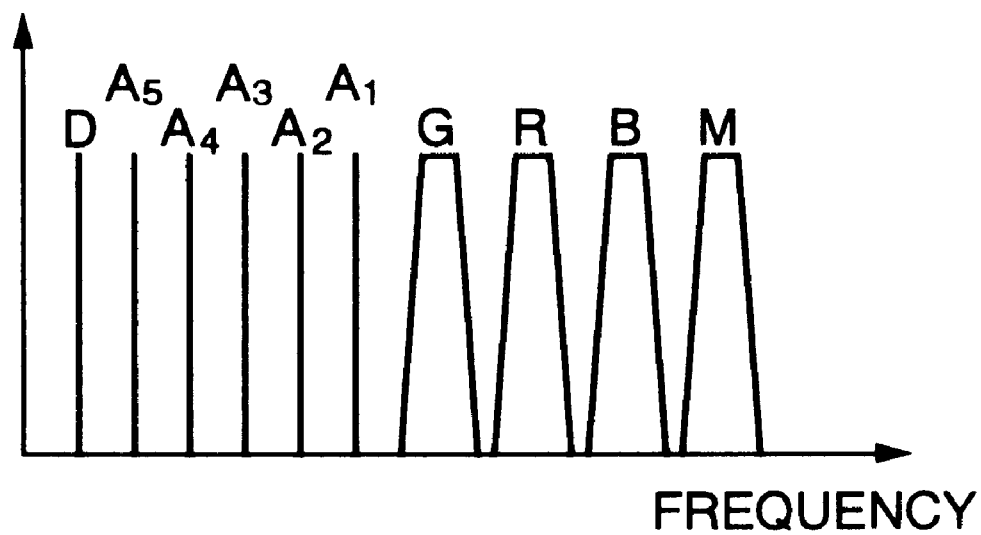
FIG. 2 is a frequency spectrum in a prior art video signal multiplex transmission system.

As has been mentioned above, when the video signal synchronization between the camera 100 and CCU 200 sides is established, control of the transmission circuit 6-1 and demultiplexer circuit 9-1 based on an output of the synchronization circuit 12 as shown in FIG. 3 enables avoidance of simultaneous presence of the transmission signals from the camera and CCU sides on the cable 7 as shown in FIGS. 5B and 5C. The presence of the 2 signals at the same time is avoided in this way, so that, in the CCU side in FIG. 1, the switch 8-2 can extract only the signal transmitted from the multiplexing circuit 5-1 and the demultiplexer circuit 9-2 can separate the extracted signal into the video and voice signals. Similarly, in the camera side, the switch 8-1 can extract only the signal transmitted from the multiplexing circuit 5-2 and the demultiplexer circuit 9-1 can separate the extracted signal into the video and voice signals.

These demultiplexed signals are restored to the original analog video and voice signals respectively through D/A converters 10-1, 10-2, 10-3 and 10-4 for the video signal and through D/A converters 11-1, 11-2, 11-3, 11-4 and 11-5 in the sides of the camera and CCU by referring to FIGS. 3 and 5.

Explanation will next be made as to the operations of the switches 8-1 and 8-2 in the transmitter-receivers 150 and 250 of the camera and CCU sides by referring to FIGS. 3 and 5A–5E. The transmission line 7 is connected to the transmission circuit 6-1 and switch 8-1, so that, when it is desired to transmit a transmission signal from the camera side through the transmission line 7 to the CCU side, the transmission signal is also provided to the switch 8-1. Thus, while the transmission circuit 6-1 is transmitting the transmission signal, it is necessary to control the switch 8-1 not to receive the signal. Likewise, the transmission line 7 is connected to the transmission circuit 6-2 and switch 8-2, so that, when it is desired to transmit a transmission signal from the CCU side through the transmission line 7 to the camera side, the transmission signal is also provided to the switch 8-2. Thus, it is necessary to control the switches 8-1 and 8-2 so that, while the transmission circuit 6-1 is transmitting the transmission signal, the switch 8-1 does not receive the transmission signal; whereas, while the transmission circuit 6-2 is transmitting the transmission signal, the switch 8-2 does not receive the transmission signal. To this end, the send/receive timing signal generation circuits 14-1 and 14-2 each generate such a send/receive timing signal as shown in FIG. 5D and provide it to the switches 8-1 and 8-2. The transmission signal issued from the send/ receive timing signal generation circuit 14-1 is set, e.g., to have its high level while the transmission signal (that is, such a signal presence period as the transmission signal corresponding to a signal duration of t1 to t2 in FIG. 5B is being transmitted from the camera side through the cable 7 to the CCU side; whereas, the transmission signal issued from the send/receive timing signal generation circuit 14-1 is set, e.g., to have its low level while the transmission signal (that is, such a signal presence period as the transmission signal corresponding to a signal duration of t3 to t4 in FIG. 5C) is being transmitted from the CCU side through the cable 7 to the camera side. Accordingly, it is designed so that the switch 8-1 does not receive an input to its input terminal during the high level period of the send/receive timing signal and receives the input only during the low level period of the send/receive timing signal.

Similarly, the transmission signal issued from the send/receive timing signal generation circuit 14-2 is set, e.g., to have its high level while the transmission signal (that is, such a signal presence period as the transmission signal corresponding to the signal duration of t3 to t4 in FIG. 5C) is being transmitted from the CCU side through the cable 7 to the camera side; whereas, the transmission signal issued from the send/receive timing signal generation circuit 14-2 is set, e.g., to have its low level while the transmission signal (that is, such a signal presence period as the transmission signal corresponding to the signal duration of t1 to t2 in FIG. 5B) is being transmitted from the camera side through the cable 7 to the CCU side. Accordingly, it is designed so that the switch 8-2 does not receive an input to its input terminal during the high level period of the send/receive timing signal and receives the input only during the low level period of the send/receive timing signal.

Explanation will next be made as to the operation of the send/receive timing signal generation circuit 14-2 in the side of the CCU. The send/receive timing signal generation circuit 14-2 counts a system clock issued from a system clock generation circuit 13-2 and generates, e.g., such a send/receive timing signal as shown in FIG. 5D on the basis of its counted value. The system clock issued from the system clock generation circuit 13-2 is provided to the transmission circuit 6-2 via a switch 15-2 so that the transmission circuit 6-2 is operated in response to the system clock. The send/receive timing signal is provided to the switch 8-2 to control the switch 8-2 in such a manner as mentioned above. The send/receive timing signal is also provided to the multiplexing circuit 5-2 to be used as a control signal for controlling the timing of generation of the transmission signal from the CCU side, the synchronization signal thereof, and so on.

Explanation will then be directed to the operation of the send/receive timing signal generation circuit 14-1 in the camera side. As mentioned above, an ordinary camera system performs its synchronizing operation based on a video signal received from the CCU side in the camera side. That is, the send/receive timing signal generation circuit 14-1 generates the send/receive timing signal in synchronism with the transmission signal received from the CCU side. More in detail, the synchronization circuit 12 extracts the word synchronizing code from the transmission signal applied to the switch 8-1 and the extracted word synchronizing code to the send/receive timing signal generation circuit 14-1. This causes the send/receive timing signal generation circuit 14-1 to generate such a send/receive timing signal as shown in FIG. 5D on the basis of the system clock received from a system clock generation circuit 13-1 and the word synchronizing code. For example, the send/receive timing signal generation circuit 14-1 starts its counting operation over the system clock received from the system clock generation circuit 13-1 in response to the word synchronizing code, and generates the send/receive timing signal on the basis of its counted value.

The system clock issued from the system clock generation circuit 13-1 is provided to the transmission circuit 6-1 via a switch 15-1 so that the transmission circuit 6-1 is operated in response to the system clock. The send/receive timing signal is provided to the switch 8-1 to control the switch 8-1 in such a manner as mentioned above.

Although the send/receive timing signal shown in FIG. 5D has been set to have its high level during the time duration of t1 to t3 and to have its low level during the time duration of t3 to t5, the timing signal may be set, for example, to have a high level during a time duration of t1 to t2 and a low level during a time duration of t2 to t5.

As has been explained above, when synchronization is established between the transmitter-receivers of the camera and CCU sides, the avoidance of presence of the respective transmission signals on the cable 7 can be highly easily realized.

In this way, when the aforementioned system is employed, bi-directional digital transmission can be realized but this also may involve the following practical problem.

That is, the transmitter-receivers provided at he both ends of the cable 7 have the transmission circuits 6-1 and 6-2 and the receiver circuits (demultiplexer circuits 9-1 and 9-2) respectively. Further, the transmission circuits 6-1 and 6-2 are operated in response to clocks supplied from the system clock generation circuits 13-1 and 13-2 of the respective transmitter-receivers, and the receiver circuits (demultiplexer circuits 9-1 and 9-2) are operated in response to clocks reproduced from the received data, respectively.

Since the respective transmitter-receivers are interconnected at their transmission and reception terminals by means of the same cable 7 at its both ends and process signals having very high frequencies, the transmitter-receivers are usually disposed close to each other. However, such close disposition causes the operation of the transmission circuit to have an adverse effect on the reception circuit or reversely causes the operation of the reception circuit to have an adverse effect on the transmission circuit.

Figure 6:
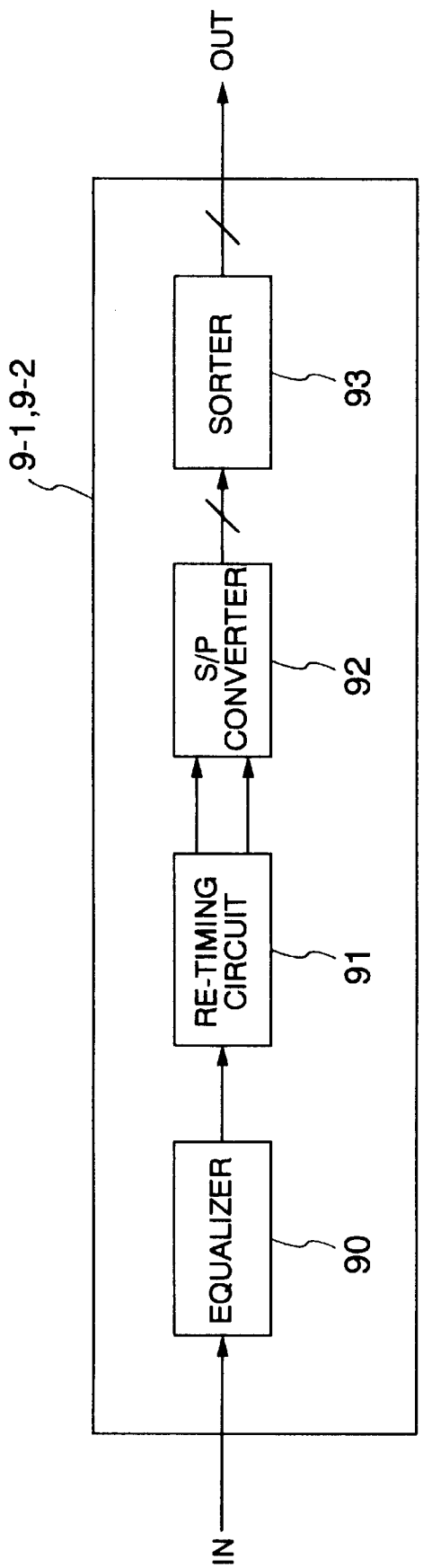
FIG. 6 is a block diagram of an exemplary structure of a reception circuit in the embodiment of FIG. 3.

This problem will be discussed more in detail below. The reception circuit (demultiplexer circuit 9-1 or 9-2) usually comprises, as shown in FIG. 6, an equalizer 90 for compensating for the high frequency loss of the cable 7 based on the receive signal (serial data) received from the CCU side via the switch 8-1, a re-timing circuit 91 for reproducing a serial clock from the serial data of the equalizer 90 based on a phase locked loop (PLL) system and for re-judging "1" or "0" of the serial data at the timing of the reproduced clock, a serial-to-parallel (S/P) conversion circuit 92 for reproducing the parallel data and parallel clock from the serial data of the clock of the re-timing circuit 91, and a sorting circuit (demultiplexing circuit) 93 for subjecting the parallel data received from the S/P conversion circuit 92 to a time-base expanding operation and for demultiplexing it into video, voice and other signals.

In this connection, the reception circuit 9-1 or 9-2 is required not to perform erroneous operation when receiving the transmission data transmitted from the transmission circuit 6-1 or 6-2 and not subjected to cable attenuation. To this end, as mentioned above, the switch 8-1 or 8-2 is controlled by the send/receive timing signal received from the send/receive timing signal generation circuit 14-1 or 14-2 respectively to block its input during the signal presence period of the transmission signal from the transmission circuit 6-1 or 6-2. However, the re-timing circuit 91 is usually of a phase locked loop (PLL) type (phase comparison/oscillation circuit), in which case the PLL circuit generates a self-oscillation frequency clock. Thus the S/P conversion circuit 92, etc provided in the latter stage are also operated based on the period of the clock.

In this way, when the reception circuit is operated based on the signal (phase, frequency) completely independent of the operation of the transmission circuit, the reception circuit adversely affects the operation of the transmission circuit positioned close thereto, which may lead to such a problem that noise or jitter is generated in the output of the transmission circuit.

To avoid this problem, in accordance with the present invention, the output of the send/receive timing signal generation circuit 14-1 or 14-2 sent to the switch 8-1 or 8-2 causes turning ON and OFF of the system clock supplied to the transmission circuit 6-1 or 6-2 and the clock generated at the reception circuit (demultiplexer circuit 9-1 or 9-2) to be controlled as shown in FIG. 3.

To attain this, the camera side is arranged so that the clock from the system clock generation circuit 13-1 is applied to the transmission circuit 6-1 through the switch 15-1 and the switch 15-1 is controlled by the send/receive timing signal received from the send/receive timing signal generation circuit 14-1. Likewise, the CCU side is arranged so that the clock from the system clock generation circuit 13-2 is applied to the transmission circuit 6-2 through the switch 15-2 and the switch 15-2 is controlled by the send/receive timing signal received from the send/receive timing signal generation circuit 14-2.

In the camera side, more specifically, while he transmission signal of the signal presence period is being transmitted from the transmission circuit 6-1 to he CCU side, the send/receive timing signal (high level) from the send/receive timing signal generation circuit 14-1 causes the switch 15-1 to be switched to its ON position, thus providing the system clock to the transmission circuit 6-1. While the transmission signal of the signal presence period received from the CCU side is being received, on the other hand, the send/receive timing signal (low level) from the send/receive timing signal generation circuit 14-1 causes the switch 15-1 to be switched to its OFF position, thus stopping the provision of the system clock to the transmission circuit 6-1.

Likewise, in the CCU side, while the transmission signal of the signal presence period is being transmitted from the transmission circuit 6-2 to the camera side, the send/receive timing signal (low level) from the send/receive timing signal generation circuit 14-2 causes the switch 15-2 to be switched to its ON position, thus providing the system clock to the transmission circuit 6-2. While the transmission signal of the signal presence period received from the camera side is being received, on the other hand, the send/receive timing signal (high level) from the send/receive timing signal generation circuit 14-2 causes the switch 15-2 to be switched to its OFF position, thus stopping the provision of the system clock to the transmission circuit 6-2.

In the camera side, the send/receive timing signal from the send/receive timing signal generation circuit 14-1 is provided to the reception circuit 9-1. Accordingly, while the transmission signal of the signal period is being transmitted from the transmission circuit 6-1 to the CCU side, the send/receive timing signal (high level) received from the send/receive timing signal generation circuit 14-1 causes the reception circuit 9-1 to stop generation of the clock therein and thus the reception circuit 9-1 fully stops its operation.

Similarly, in the CCU side, the send/receive timing signal from the send/receive timing signal generation circuit 14-2 is provided to the reception circuit 9-2. Accordingly, while the transmission signal of the signal period is being transmitted from the transmission circuit 6-2 to the camera side, the send/receive timing signal (low level) received from the send/receive timing signal generation circuit 14-2 causes the reception circuit 9-2 to stop generation of the clock therein and thus the reception circuit 9-2 fully stops its operation.

As a practical method for stopping the clock in the reception circuit, it is considered to gate the output clock through an external circuit when the clock is of a high speed type such as the serial clock generated by the re-timing circuit 91 in the reception circuit. However, in this case, it becomes sometimes impossible to completely avoid the noise influences.

In this connection, when the PLL operation for generation of the serial clock in the re-timing circuit 91 is completely stopped, a considerable rise time is required for the reception circuit after the reception circuit starts its signal receiving operation.

In such a case, it is only required to prevent the output clock of the PLL of the re-timing circuit 91 from being applied to the S/P conversion circuit 92, whereby the operation of the reception circuit during the transmitting operation of the transmission circuit can be stopped and the rising operation of the reception circuit at the time of starting its signal receiving operation can be quickly attained.

By the way, the output stage of a high-speed operational circuit has usually an emitter coupled logic (ECL) structure. More specifically, the output stage of the re-timing circuit 91 has such a structure as shown in FIG. 7. That is, an output transistor for outputting a serial clock is connected at its emitter to a switch 20 through a pull-down resistor 95, the switch 20 is connected at its one end 20a to a high level potential and at the other end 20b to a low level (grounding potential). With such a configuration, the send/receive timing signal received from the send/receive timing signal generation circuit 14-1 or 14-2 is provided to the switch 20 to selectively stop the supply of the serial clock from the re-timing circuit 91 to the S/P conversion circuit 92.

In the camera side, meanwhile, the send/receive timing signal (high level) received from the send/receive timing signal generation circuit 14-1 causes the switch 20 to be connected to the low level, so that the serial clock from the re-timing circuit 91 is interrupted and the operation of the reception circuit 9-1 is stopped.

Similarly, in the CCU side, the send/receive timing signal (low level) received from the send/receive timing signal generation circuit 14-2 causes the switch 20 to be connected to the low level, so that the serial clock is interrupted and the operation of the reception circuit 9-2 is stopped.

With such an arrangement as mentioned above, the operation of the reception circuit during the transmitting operation of the transmission circuit can be stopped and the rising operation of the reception circuit at the time of starting its signal receiving operation can be quickly effected.

As has been explained in the foregoing, in accordance with the present invention, there can be solved such a problem that, when the reception circuit is operated during the signal transmitting period or when the transmission circuit is operated during the signal receiving operation, the both signals interfere with each other, thus increasing noise or jitter.

Although the above explanation has been made, as an example, in connection with such a wired transmission line as the coaxial cable in the present embodiment, the present invention is not limited to the wired transmission line but may be applied also to a multiplex radio transmission line of video, voice and data such as a field pickup unit (FPU).

It goes without saying that, when the circuit operation is adversely influenced only by either one of the transmission circuit or reception circuit, it is only required to control the associated circuit alone.

In accordance with the present invention, there can be provided a bi-directional signal transmission system in which digital signals are transmitted from the both ends of the transmission line, which can solve such a problem that, when the reception circuit is operated during the signal transmitting period or when the transmission circuit is operated during the signal receiving operation, the both signals interfere with each other, thus increasing noise or jitter, and thus which can stably realize high-performance image transmission without noise and distortion.

In the present invention, in each of the respective video appliances, there may be stopped at least one of the operation of the reception circuit in the video appliance during the transmission of the transmission signal of the signal presence period from the transmission circuit to the transmission line and the operation of the transmission circuit in the video appliance during the receiving operation of the reception circuit of the transmission signal of the signal presence period transmitted through the transmission line.

What is claimed is:

1. A video signal transmission system wherein digital signals containing at least digital video signals and digital audio signals are bidirectionally transmitted and received in substantially real time in first and second video appliances coupled via a transmission path, said first video appliance including a first transmitting and receiving apparatus and said second video appliance including a second transmitting and receiving apparatus, said first transmitting and receiving apparatus comprising:

means for producing a first digital signal by time-division multiplexing at least said digital video signal and said digital audio signal;

means for dividing said first digital signal into a plurality of predetermined periods and time-base compressing said first divided digital signal to produce a first divided and compressed digital signal repeating a signal period and a no signal period alternately;

transmitting means for transmitting said first divided and compressed digital signal to said second video appliance through said transmission path in a manner that said first divided and compressed digital signal during said signal period thereof is transmitted through said transmission path during a no signal period of a second divided and compressed digital signal transmitted through said transmission path from said second video appliance;

receiving means for receiving said second divided and compressed digital signal repeating a signal period and said no signal period alternately from said second video appliance through said transmission path in a manner that said second divided and compressed digital signal during said signal period thereof is transmitted through said transmission path during said no signal period of said first divided and compressed digital signal transmitted to said second video appliance through said transmission path;

expanding and separating means for time-base expanding said second divided and compressed digital signal and for separating said time-base expanded second digital signal to reproduce at least a digital video signal and a digital audio signal; and stopping means for stopping one of operation of said expanding and separating means during each period where said transmitting means transmits said first divided and compressed digital signal during said signal period thereof, and operation of said transmitting means during each period where said receiving means receives said second divided and compressed digital signal during said signal period thereof.

2. A video signal transmission system as set forth in claim 1, wherein said first transmitting and receiving apparatus further comprises a clock generation circuit for generating a system clock for activation of said transmitting means and providing said system clock to said transmitting means; and wherein said stopping means stops supply of said system clock from said clock generation circuit to the transmitting means during said signal period of said second divided and compressed digital signal received by said receiving means.

3. A video signal transmission system as set forth in claim 1, wherein said expanding and separating means of said first transmitting and receiving apparatus includes a clock generation circuit for generating a clock on the basis of said second divided and compressed digital signal during said signal period thereof, and a circuit for expanding and separating said second divided and compressed digital signal during said signal period thereof on the basis of said clock generated by said clock generation circuit; and wherein said stopping means stops supply of the clock from said clock generation circuit to said expanding and separating circuit during each period where said transmitting means transmits said first divided and compressed digital signal during said signal period thereof.

4. A video signal transmission system as set forth in claim 1, wherein one of said first and second video appliances is a television camera and the other thereof is a unit for controlling said television camera.

5. A signal transmission system wherein digital signals containing at least digital video signals and digital audio signals are bidirectionally transmitted and received in substantially real time in first and second video appliances coupled via a transmission path, said first video appliance including a first transmitting and receiving apparatus and said second video appliance including a second transmitting and receiving apparatus, said first transmitting and receiving apparatus comprising:

means for producing a first digital signal by time-division multiplexing at least said digital video signal and said digital audio signal;

means for dividing said first digital signal into a plurality of predetermined periods and time-base compressing said first divided digital signal to produce a first divided and compressed digital signal repeating a signal period and a no signal period alternately;

first transmitting means for transmitting said first divided and compressed digital signal to said second video appliance through said transmission path in a manner that said first divided and compressed digital signal during said signal period thereof is transmitted through said transmission path during a no signal period of a second divided and compressed digital signal transmitted through said transmission path from said second video appliance;

first receiving means for receiving said second divided and compressed digital signal repeating a signal period and said no signal period alternately from said second video appliance through said transmission path in a manner that said second divided and compressed digital signal during said signal period thereof is transmitted through said transmission path during said no signal period of said first divided and compressed digital signal transmitted to said second video appliance through said transmission path;

first expanding and separating means for time-base expanding said second divided and compressed digital signal and for separating said time-base expanded second digital signal to reproduce at least a digital video signal and a digital audio signal; and first stopping means for stopping one of
operation of said first expanding and separating means during each period where said first transmitting means transmits said first divided and compressed digital signal during said signal period thereof, and
operation of said first transmitting means during each period where said first receiving means receives said second divided and compressed digital signal during said signal period thereof;

said second transmitting and receiving apparatus comprising:
means for producing a second digital signal by time-division multiplexing at least said digital video signal and said digital audio signal;
means for dividing said second digital signal into a plurality of predetermined periods and time-base compressing said second divided digital signal to produce a second divided and compressed digital signal repeating a signal period and a no signal period alternately;
second transmitting means for transmitting said second divided and compressed digital signal to said first video appliance through said transmission path in a manner that said second divided and compressed digital signal during said signal period thereof is transmitted through said transmission path during said no signal period of said first divided and compressed digital signal transmitted through said transmission path from said first video appliance;
second receiving means for receiving said first divided and compressed digital signal repeating a signal period and said no signal period alternately from said first video appliance through said transmission path in a manner that said first divided and compressed digital signal during said signal period thereof is transmitted through said transmission path during said no signal period of said second divided and compressed digital signal transmitted to said first video appliance through said transmission path;
second expanding and separating means for time-base expanding said first divided and compressed digital signal and for separating said time-base expanded second digital signal to reproduce at least a digital video signal and a digital audio signal; and
second stopping means for stopping one of
operation of said second expanding and separating means during each period where said second transmitting means transmits said second divided and compressed digital signal during said signal period thereof, and
operation of said second transmitting means during each period where said second receiving means receives said first divided and compressed digital signal during said signal period thereof.

6. A signal transmission system as set forth in claim 5, wherein said first transmitting and receiving apparatus further comprises a first clock generation circuit for generating a system clock for activation of said first transmitting means and providing said system clock to said first transmitting means;

wherein said first stopping means stops supply of said system clock from said first clock generation circuit to the first transmitting means during each period where said first receiving means receives said second divided and compressed digital signal during said signal period thereof;

wherein said second transmitting and receiving apparatus further comprises a second clock generation circuit for generating a system clock for activation of said second transmitting means and providing said system clock to said second transmitting means; and wherein said second stopping means stops supply of said system clock from said second clock generation circuit to the second transmitting means during each period where said second receiving means receives said first divided and compressed digital signal during said signal period thereof.

7. A signal transmission system as set forth in claim 5, wherein said first expanding and separating means of said first transmitting and receiving apparatus includes a first clock generation circuit for generating a clock on the basis of said second divided and compressed digital signal during said signal period thereof, and a first expanding and separating circuit for expanding and separating said second divided and compressed digital signal during said signal period thereof on the basis of said clock generated by said first clock generation circuit;

wherein said first stopping means stops supply of the clock from said first clock generation circuit to said first expanding and separating circuit during each period where said first transmitting means transmits said first divided and compressed digital signal during said signal period thereof;

wherein said second expanding and separating means of said second transmitting and receiving apparatus includes
- a second clock generation circuit for generating a clock on the basis of said first divided and compressed digital signal during said signal period thereof, and
- a second expanding and separating circuit for expanding and separating said first divided and compressed digital signal during said signal period thereof on the basis of said clock generated by said second clock generation circuit; and wherein said second stopping means stops supply of the clock from said second clock generation circuit to said second expanding and separating circuit during each period where said second transmitting means transmits said second divided and compressed digital signal during said signal period thereof.

8. A signal transmission system as set forth in claim 5, wherein one of said first and second video appliances is a television camera and the other thereof is a unit for controlling said television camera.

* * * * *